UNITED STATES PATENT OFFICE.

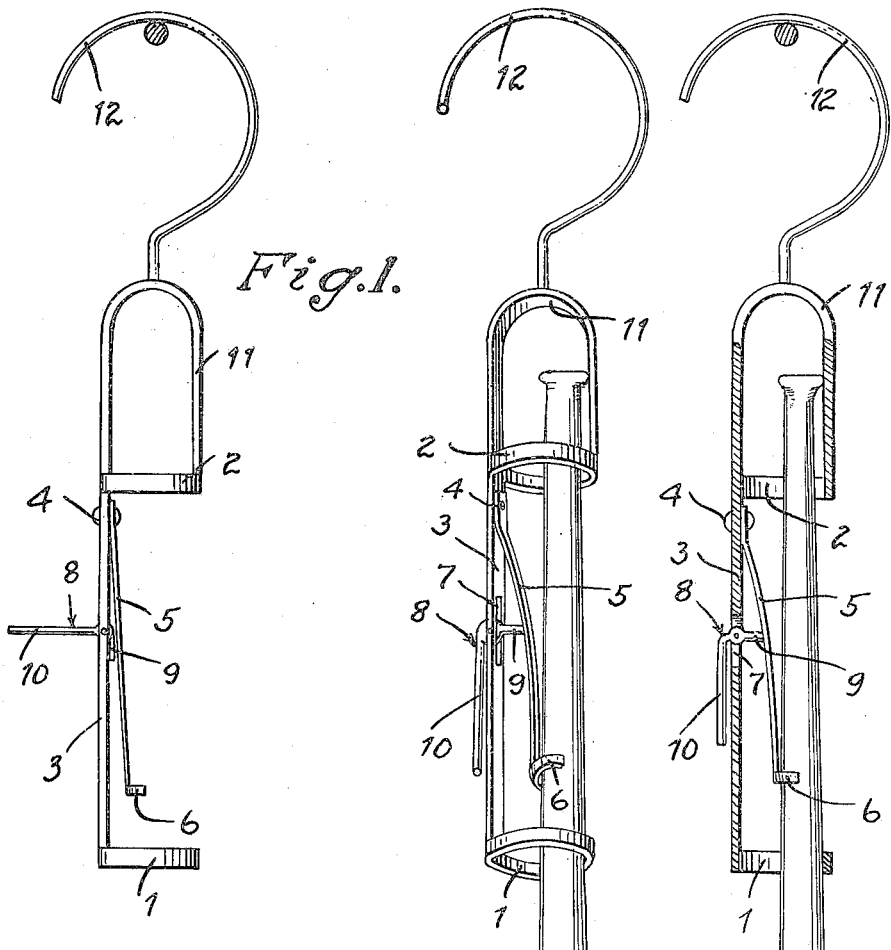
M. V. B. GREEN.
FISHING POLE HANGER.
APPLICATION FILED APR. 18, 1914.
1,127,987.
Patented Feb. 9, 1915.
Inventor
M. V. B. Green

MARTIN V. B. GREEN, OF OLD TOWN, FLORIDA.

FISHING-POLE HANGER.

1,127,987.  Specification of Letters Patent.  Patented Feb. 9, 1915.

Application filed April 18, 1914. Serial No. 832,721.

*To all whom it may concern:*

Be it known that I, MARTIN V. B. GREEN, a citizen of the United States, residing at Old Town, in the county of Lafayette, State of Florida, have invented certain new and useful Improvements in Fishing-Pole Hangers; and I do hereby declare the following to be a full, clear, and exact description of the invention, such as will enable others skilled in the art to which it appertains to make and use the same.

This invention relates to a fishing pole hanger.

An object of the invention is to provide a device whereby a pole may be hung to a limb of a tree or any other such projection either while fishing when it is necessary to fix the pole or when the pole is not in use.

With the above and other objects in view, such as will appear as the description progresses, my invention comprises the combination and arrangement of parts as herein set forth and subsequently claimed.

Referring to the drawing; Figure 1 is a side elevation of my device, showing the spring clamping means for the pole in inoperative position. Fig. 2 is a perspective view of the device with a pole in place therein, showing the clamping means in operative position. Fig. 3 is a longitudinal section of Fig. 2. Fig. 4 is an end view of Fig. 2.

Referring to the drawing by reference characters wherein like parts are indicated by like characters: My device comprises two rings 1 and 2 joined to each other by a shank 3 integral with both of the said rings. Secured to the inside of the said shank 3 by a rivet 4 is a leaf spring 5 having on its free end an arcuate clamping member 6 adapted to engage a fishing pole. Pivoted to the said shank 3 in an aperture 7 is a bell crank lever 8 having a short arm 9 and a long arm 10. The short arm projecting from the shank 3 and when the lever is in inoperative position substantially parallel to said shank. The inner end of this arm 9 is adapted to bear against the spring 5 to clamp a fishing rod. Projecting upwardly from the ring 2 and integral therewith and with the shank member 3 is a U-shaped member 11 to the bight portion of which is integrally formed an outwardly extending hook 12.

When it is desired to hang a pole up either while fishing or when the pole is not in use, it is only necessary to insert the end of the pole through the ring 1 and then through the ring 2, the spring 5 lying at this time against the lower face of the shank 3 and the arm 9 parallel to the said shank. When the pole has been put in this position the arm 10 of the lever 8 is swung downwardly and the arm 9 thus moved into contact with the spring 5 and pushes the spring downwardly about the rivet 4 as a pivot, this causes the arcuate member 6 to be forced into contact with the pole, and thus clamp the same between it and one side of each of the rings 1 and 2. The pole then may be hung up in any convenient place and may thus be kept in such position that better results may be obtained therewith.

From the above description it may be seen that by making the rings, shank, hook and the inverted U-shaped member all integral therewith and of skeleton construction, that I have provided a device which is neat, durable and exceedingly efficient.

I do not wish to be limited to the particular construction shown any further than is necessary by the claim, for it is evident that numerous mechanical changes may be made within the scope of the invention.

What is claimed is:—

A fishing rod hanger comprising two spaced parallel rings, a shank integral with each of the rings and connecting the same, a leaf spring secured to said shank, gripping means on the free end of said leaf spring, a lever for operating said leaf spring to grip a pole inserted through the aforementioned rings, an inverted U-shaped member integral with the said shank and the said rings, a hook formed on the bight portion of said U-shaped member, as and for the purpose set forth.

In testimony whereof, I affix my signature, in the presence of two witnesses.

MARTIN V. B. GREEN.

Witnesses:
J. J. DRIGGERS,
W. T. GREEN.

Copies of this patent may be obtained for five cents each, by addressing the "Commissioner of Patents, Washington, D. C."